(12) United States Patent
Bates et al.

(10) Patent No.: US 7,000,116 B2
(45) Date of Patent: Feb. 14, 2006

(54) PASSWORD VALUE BASED ON GEOGRAPHIC LOCATION

(75) Inventors: Cary Lee Bates, Rochester, MN (US); Eric John Nelson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 09/804,358

(22) Filed: Mar. 12, 2001

(65) Prior Publication Data

US 2002/0129283 A1    Sep. 12, 2002

(51) Int. Cl.
*H04L 9/00* (2006.01)
(52) U.S. Cl. .................................... 713/182
(58) Field of Classification Search ............... 713/202, 713/182–186
See application file for complete search history.

(56) References Cited

U.S. PATENT DOCUMENTS

| 5,731,785 A | 3/1998 | Lemelson et al. ........... 342/357 |
| 5,748,084 A | 5/1998 | Isikoff ........................ 340/568 |
| 5,757,916 A | 5/1998 | MacDoran et al. ........... 380/25 |
| 5,835,881 A | 11/1998 | Trovato et al. ............. 701/211 |
| 5,861,841 A | 1/1999 | Gildea et al. ............... 342/357 |
| 5,872,557 A | 2/1999 | Wiemer et al. .............. 345/156 |
| 5,922,073 A | 7/1999 | Shimada ..................... 713/200 |
| 6,009,116 A | 12/1999 | Bednarek et al. ........... 375/200 |
| 6,370,629 B1 * | 4/2002 | Hastings et al. ............. 711/163 |
| 6,721,738 B1 * | 4/2004 | Verplaetse et al. ............. 707/6 |

FOREIGN PATENT DOCUMENTS

| JP | 6301446 | 10/1994 |
| JP | 7128427 | 5/1995 |
| JP | 7248849 | 9/1995 |

OTHER PUBLICATIONS

Bates, et al, U.S. Appl. No. 11/149,486, "A Method and Apparatus for Defining a Behavior Region Communication Device", filed Jun. 9, 2005.

* cited by examiner

*Primary Examiner*—Gregory Morse
*Assistant Examiner*—Thomas Ho
(74) *Attorney, Agent, or Firm*—Karuna Ojanen; Grant A. Johnson

(57) ABSTRACT

An electronic processing device having GPS card and antenna, such as a laptop or personal digital assistant, can be enable only when a geographic-specific password is entered. Geographic regions are established in the electronic processing device with a user interface and priorities can be granted to the regions. The user further stores a geographic-specific password for each of the geographic regions. When the user travels and wishes to enable the electronic processing device, the GPS card and antenna receive and process the device's current location. When the user inputs a password, the electronic device determines if the password is appropriate for the current location. If not, access is denied.

17 Claims, 10 Drawing Sheets

| Region Data 312 | | | | |
|---|---|---|---|---|
| Location Coordinates | Priority 314 | Password 316 | Name 318 | 310 |
| 320 | | | | |
| | | | | |
| | | | | |

| Password Verification Region Data | | | | |
|---|---|---|---|---|
| Locational Data | Password verification PGM ⎯412 | | | |

PASSWORD VALUE BASED ON GEOGRAPHIC LOCATION

TECHNICAL FIELD

This invention relates generally to the field of accessing electronic devices and more particularly relates to enabling an electronic device using a password associated with a geographic position.

BACKGROUND OF THE INVENTION

People in our society have become increasingly mobile and, not coincidentally, have increasingly come to rely on their electronic devices such as laptop computers, cellular phones, hand-held personal digital assistants, etc. as they travel. These devices, moreover, have become increasingly more complex and capable of maintaining a myriad of programs as well as maintaining connections with networks such as the Internet. Telecommuting, i.e., maintaining a business office in a place other than a headquartered office such as one's home and connecting to an employer through a computer or hand-held microprocessing device, occurs across town, across the country, and even across international borders. People demand more of their electronic communication devices too. People want to be able to conduct personal and/or business financial transactions, legal transactions, communications with business associates, employers, employees, family, friends all with one device.

In a perfect world, there would be no need for security of one's information but information has been protected as long as the first secret was spoken; and as long as a person or business entity considers his/her own information confidential. An electronic device having confidential information may need only be enabled at a place of employment or other specific location and it is preferred or even required that access not be granted to the device outside of a particular locale. The devices, moreover, have become subject to thievery irrespective of the information contained therein. So, it is imperative that a person be able to restrict use of a device.

There are, moreover, a number of security schema which use geographic location as a method to restrict access to devices or to enable certain devices. The Global Positioning System (GPS) was designed for, is funded and operated by the U.S. Department of Defense (DOD) although there are many thousands of civilian uses of GPS world-wide. The nominal GPS Operational Constellation consists of twenty-four satellites that orbit the earth in twelve hours. There are often more than twenty-four operational satellites as new ones are launched to replace older satellites. A satellite orbit repeats almost the same ground track as the earth turns beneath them once each day. A system of tracking stations are located around the world with the Master Control facility at Schriever Air Force Base in Colorado. These monitor stations measure signals from the satellites which are incorporated into orbital models for each satellite which compute precise orbital data and clock corrections for each satellite. The Master Control station uploads the corrected orbital and clock data to the satellites. The satellites then send subsets of the orbital data to GPS receivers via radio signals all over the world. The GPS receiver processes the signals to compute position, velocity and time of the satellite and/or the receiver. Four GPS satellite signals are used to compute positions in three dimensions and the time offset in the receiver clock.

GPS has been used for years in aircraft, ships, etc. but now consumers are using GPS in computers, automobiles, cellular phones, etc. One such security system is set forth in U.S. Pat. No. 5,922,073 entitled System and Method for Controlling Access to Subject Data Using Location Data Associated with the Subject Data and a Requesting Device to Shimada. In this system, a user enters a password associated with the data, simultaneously a GPS receiver detects the location and if the location is not the proper location attributed to the data, access to the data is prohibited. Shimada restricts access only to data by two independent tests: first, the password entered must be the correct password for that data; and second, the requesting device must be in an allowable geographic location. The password itself is not associated with the geographic location. Shimada, moreover, allows access to the requesting device and limits access only to data, which under some circumstances, may be undesirable. As an example, it is more likely that a hacker will presume a password to be associated with or correlated to particular data, as in Shimada, rather than with a particular geographic location. It is easier to invoke data intrusion or hacking algorithms once access is granted to a requesting device than when the device cannot even be enabled. Additionally, inadvertent access to critical information or other applications resulting in hard-drive failure or other failures or damage to the system by, for instance, children is easier if a system is enabled and usable. Thus, more secure protection from intentional intrusion and/or accidental damage occurs when the requesting device may not even be enabled.

Another device is disclosed in a Research Disclosure 421139 entitled *Automatic laptop reconfiguration based on location* of May 1999 in which a GPS tracking chip within a laptop computer interacts with the operating system and other program to automatically reconfigure the system clock, time zones, telephone numbers to call for network connections, etc., upon traveling to different time zones. Access is still allowed, however, to the computer and its processes, with the attendant risks as described above.

Shimada and other art, moreover, make no accommodation for overlapping and/or adjacent geographic regions and for assigning priorities to those regions. A user is tasked with remember which password is applicable to which data and if she/he crosses a street or enters another building, may be required to enter another password. In this time of memorizing and updating our multitude of passwords, life could be simplified if only the password for the highest priority geographic region in which the electronic processing device is located need be entered. The user need not concern herself/himself with remembering which password is associated with which application or with which building at a site if the user need only enter a password for entire site and if the site password has a higher priority than the building password.

There is thus a need in the industry to restrict access to an electronic processing device by simply entering a password based on geographic location. There is a further need in the industry to allow or restrict access to a device in overlapping and/or adjacent geographic locations in terms of priority of the geographic regions.

SUMMARY OF THE INVENTION

These needs and others that will become apparent to one skilled in the art are satisfied by an processing device, comprising: a user interface to interact with a user; location detection electronics; processing electronics connected to the user interface and the location detection electronics; a memory connected to the processing electronics to store a plurality of passwords associated with a plurality of geographic regions; and a gatekeeper to access the processing electronics when an input password from the user interface is the same as a password in memory and when the location detection electronics inputs a present location to the processing electronics that is one of the plurality of geographic regions with which the input password is associated.

The invention may further be considered a method to establish a password in an electronic processing device, comprising the steps of: invoking a user interface of the electronic processing device; entering a description of a first geographic location; creating a first password; associating the first password with the first geographic region; enabling a user to access information within the electronic device when the electronic device is in the first geographic region only when the first password is entered by the user.

Entering a description of a first geographic region may be accomplished in a number of ways. In one embodiment a user may obtain the GPS location from GPS processing electronics within the electronic processing device and create boundaries by extending a selected distance from the GPS location. In another embodiment, a user may delineate the boundaries of the first geographic region using a graphical user interface on a map containing the first geographic region. Still, yet a user may enter the longitude and latitude coordinates of the boundaries of the geographic region. And yet, a user may enter a street address associated with a geographic region.

A user may enter a description of a second geographic region and create a second password associated with the second geographic region. Priorities may assigned to the first and second geographic region. The method may further comprise allowing the user to access the electronic processing device in the second region by entering the first password if the first geographic region is of higher and/or equal priority than the second geographic region and the electronic processing device is in an area of the second region overlapping an area of the first region. Creating a password may further require inspecting the password to determine it is valid according to password generation rules. The method further contemplates that the first password and the second passwords are inspected to determine if they are valid according to password generation rules. The password generation rules may differ from password to password and from geographic region to geographic region.

The user may further access information within the electronic device when the electronic device is in the first geographic region only when the first password is entered by the user, further comprises determining the present location of the electronic device using GPS signals processed by GPS processing electronics within the electronic device.

In another embodiment, the invention is a method to restrict access to an electronic processing device, comprising the steps of: invoking a user interface of the electronic processing device; determining the present location of the electronic device; entering a geographic-specific password; allowing access to the electronic processing device only when the geographic-specific password is associated with the present location of the electronic device.

The invention may further be considered a method to protect an electronic processing device from unauthorized use, comprising the steps of: invoking a user interface of the electronic processing device; entering a description of at least one geographic location by a method selected from the group of methods consisting of: obtaining the GPS location from GPS processing electronics within the electronic processing device and creating boundaries by extending a selected distance from the GPS location, delineating the boundaries of the first geographic region using a graphical user interface on a map containing the first geographic region, entering the longitude and latitude of the boundaries of the geographic region, and entering a street address associated with a geographic region; creating at least one password; associating each of the at least one password with one of the at least one geographic region; determining the present location of the electronic processing device using GPS signals processed by GPS processing electronics within the electronic processing device; assigning priority to the at least one geographic region; allowing the user to use the electronic processing device in the at least one geographic region by entering the at least one password if the at least one geographic region is the geographic region associated with the at least one password or if the at least one password is associated with a geographic region of higher or equal priority that contains the at least one geographic region.

The invention is also an article of manufacture, comprising a data storage medium tangibly embodying a program of machine readable instructions executable by an electronic processing apparatus to perform method steps for operating the electronic processing apparatus, the method steps comprising the steps of: storing a plurality of descriptions of geographic regions; storing a plurality of passwords, each associated with one or more of the descriptions of geographic regions; assigning a priority to each of the plurality of descriptions of geographic regions; determining the present location of the electronic processing device; and allowing a user to use the electronic processing device in the present location by entering an input password if the present location is within the description of the geographic region associated with the input password.

The invention is also a secure electronic processing device, comprising: means to store a plurality of descriptions of geographic locations in which said secure electronic processing device may be used; means to store a plurality of geographic-specific passwords, each of said passwords associated with each of said geographic locations; means to determine the present location of said electronic processing device; means to determine that said present location is one of said geographic locations; means to request an input password from a user; means to allow access to the electronic processing device only if said input password is one of said geographic-specific passwords pertaining to said present location. The means to determine that the present location is one of said geographic locations may further comprise a GPS antenna and GPS processing electronics.

BRIEF DESCRIPTION OF THE DRAWING

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying Drawing, wherein:

FIG. 3 is a data structure of the geographic region data particularly associated with a password, priority, and a name.

FIG. 4 is a chart illustrating how which password rule program is associated with a particular geographic location.

DETAILED DESCRIPTION OF THE INVENTION

Figure 1:
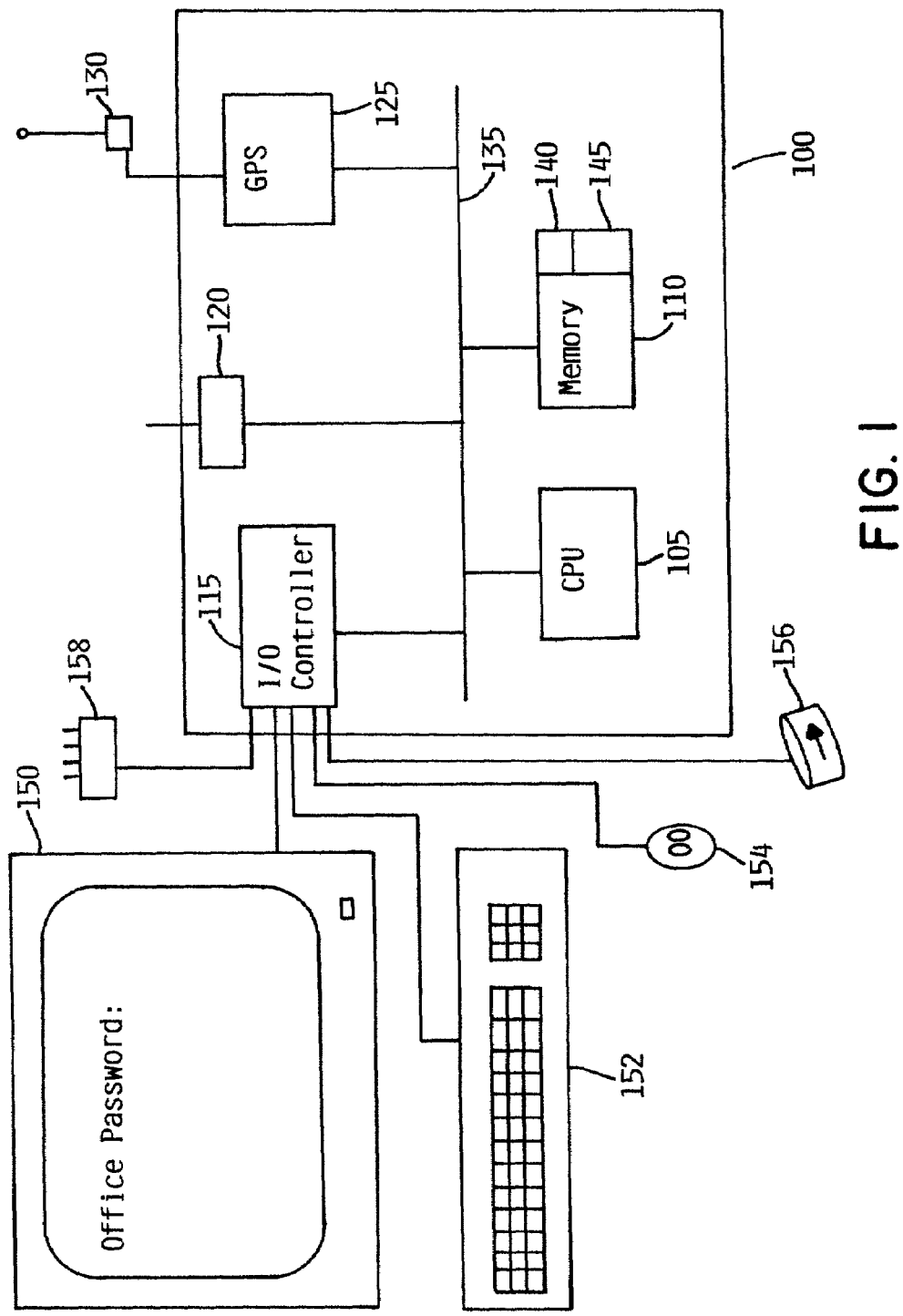
FIG. 1 is a high-level block diagram of an electronic processing device embodied as a computer system capable of implementing the invention.

Referring to the Drawing, wherein like numbers denote like parts throughout the several views, FIG. 1 shows a high-level block diagram of an electronic processing device 100, consistent with the preferred embodiment. Electronic processing device 100 may comprise a central processing unit (CPU) 105, memory 110, I/O controller and interface 115, network and/or Internet interface 120, and geographic processing electronics 125 connected to a transmitting/receiving antenna 130. Geographic processing electronics 125 and transmitting/receiving antenna 130 may be integrated as in a GPS PCMCIA card such as that disclosed in U.S. Pat. No. 5,861,841 entitled Compact GPS Receiver/Processor to Gildea et al. The various devices communicate with each other via internal communications bus 135 which supports transfer of data, commands and other information between different devices; while shown in simplified form as a single bus, it is typically structured as multiple buses; and may be arranged in a hierarchical form.

CPU 105 may be a programmable processor, executing instructions stored in memory 110; while a single CPU 105 is shown in FIG. 1, it should be understood that electronic processing systems having multiple CPUs could be used. Memory 110 is a random-access semiconductor memory for storing data and programs; memory is shown conceptually as a single monolithic entity, it being understood that memory is often arranged in a hierarchy of caches and other memory devices. Operating system 140 and applications 145 reside in memory 110. Operating system 140 provides, inter alia, functions, such as device interfaces, management of memory pages, management of multiple tasks, etc. as is well-known in the art. Applications 145 may include a browser which provides a user-interface to the world wide web through the network/Internet interface 120. Some applications 145 including the browser may be integrated into operating system 140. I/O controller 115 may support the attachment of a single or multiple terminals, and may be implemented as one or multiple electronic circuit cards, adapters, or other units one of which may be a display adapter to support video display 150, which may be a cathode-ray tube display or a touch panel, although other display technologies may be used. A keyboard/pointer adapter supports keyboard or keypad 152 and pointing device 154 depicted as a mouse, it being understood that other forms of input devices such as a pointing stylus could be used. A storage adapter supports one or more data storage devices 156 which may be rotating magnetic or optical disk drives, although other data storage devices could be used. A printer adapter supports printer and/or other output devices, such as speakers (not shown). Other adapters may support any of a variety of additional devices, such as communication hub 158, audio devices, etc.

Network/Internet interface 120 provides a physical connection for transmission of data to and from the Internet or any other network, and could use any various available technologies. This interface may comprise a modem connected to a telephone line, through which an Internet access provider or on-line service provider is reached, but increasingly other higher bandwidth interfaces are implemented. For example, electronic processing device 100 may be connected to a local mainframe computer system via a local area network using an Ethernet, Token Ring, or other protocol, the mainframe in turn being connected to the Internet. Alternatively, Internet access may be provided through cable TV, wireless, or other types of connection.

The electronic processing device shown in FIG. 1 is intended to be a simplified representation of a computer system, it being understood that many variations in system configuration are possible in addition to those specifically mentioned here. Electronic processing device 100 need not be a personal computer system such as that depicted in FIG. 1, and it may be a larger computer system, such as another server, or a smaller computer system, such as a notebook or laptop computer. Finally, electronic processing device 100 need not be a computer at all, but may be a simpler appliance-like client devices with less memory. It is fully intended that electronic processing device 100 include any electronic device which may interact through user-interfaces to execute a processing application and to be able to transmit/receive data relating to geographic location, and in response thereto, enable processing within the electronic processing device. Examples of other intended electronic processing devices 100, which list is not intended to be exhaustive but merely exemplary, include a network terminal or a thin client or other terminal-like devices having smaller memory; voice response units (VRUs); terminals; world wide web browsers; and even pervasive mobile devices, such as personal digital assistants, pagers, and cell-phones.

As will be described in detail below, aspects of the preferred embodiment pertain to specific method steps implementable on an electronic device having a computer processor. In an alternative embodiment, the invention may be implemented as a computer program-product for use with an electronic processing device 100. The programs defining the functions of the preferred embodiment can be delivered to the electronic processing device 100 via a variety of signal-bearing media, which include, but are not limited to information stored on a writable or non-writable storage media, e.g., read only memory devices such as magnetic or optical disks readable by a disk drive or floppy disks within diskette drive or hard-disk drive; or information conveyed to a computer by a telephone or a cable media network, including wireless communications. Such signal-bearing media, when carrying computer-readable instructions that direct the functions of the present invention, represent alternative embodiments of the present invention.

Figure 2:
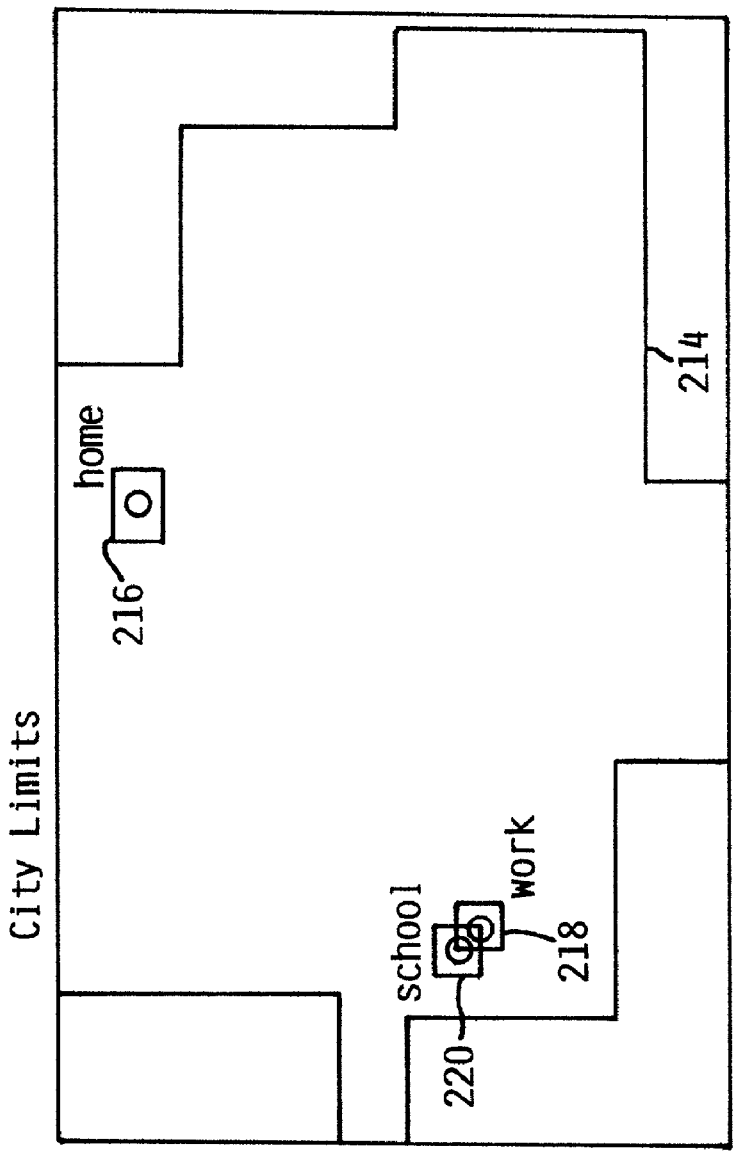
FIG. 2 is an illustration of a graphical user interface which allows a user to ascribe passwords to a particular geographic region in accordance with principles of the invention.

Each electronic processing system 100 has the necessary combination of hardware and software to implement a user interface by which a user can interact with the electronic processing device. FIG. 2 is an example of a user interface by which the user can implement the location-specific password features of the invention. Given a user interface, such as a map 210 shown on a monitor, for example, a user can move the boundaries of a geographic location or enter the coordinates, either in longitude/latitude or some other x-y or polar coordinate system, of a region 212 for which he/she wishes to implement a specific password. Shown in FIG. 2 are four regions: (a) the city limits 214; (b) home 216; (c) work 218; (d) school 220. Given the user interface, the user then defines the boundaries of each of these regions, perhaps by entering an address or by moving the arrows of a graphical user interface, by voice commands, etc. Alternatively, the user may be able to physically place the electronic device in a geographic region and the GPS processing electronics will automatically set the boundaries of the region if the user indicates that the particular location is intended to be a boundary of the region. In accordance with an embodiment of the invention, the user presents a password for each of the regions. There may be a parent region, such as that circumscribed by the city limits 214. Within that parent region 214, there may be child regions home 216 and school 220, which may have the same or different password. If the passwords are the same, a user having only the child password may access the device only in regions home 216 and school 220, while a user with the parent password may access the device anywhere within the city limits 214. The invention makes accommodations for overlapping regions such as that shown with work 218 and school 220. In any event, once within the geographic location, if the proper password is not input, access to the device is denied.

FIG. 3 is a table of data records used by the processes of the invention. Corresponding to each of the geographic regions programmed, each represented by a row 320, there is associated the location coordinates of the region 312, preferably in signal format for GPS although other geographic descriptions may also be used; a priority field 314; a password 316; and an optional name 318 of the region, such as "work" or "home." The priority column 314 is the priority of the geographic region 320. Given overlapping regions such as the work and school regions 218, 220 in FIG. 2, the region having the highest priority is the one that determines the password required to gain access to the devices and/or a specific function. This data can be stored in memory 110 or can be generated immediately upon start up of the electronic processing device.

The password may be constrained by password rules. Password rules may range from complex mathematical encryption to simple rules like "the password must be at least eight alpha-numeric characters with at least two numbers and without any two subsequent characters being the same character." There are a myriad of password rules. FIG. 4 is a chart representing the password rules program 412 for any password associated with this geographic region 320. The password rules, moreover, may vary from region to region, e.g., the password rules for "work" may be more stringent or just different than any passwords set for home. The password rules verification program 412 for each geographic region is executed to ensure that the password created meets the rules for that region 320.

Figure 5:
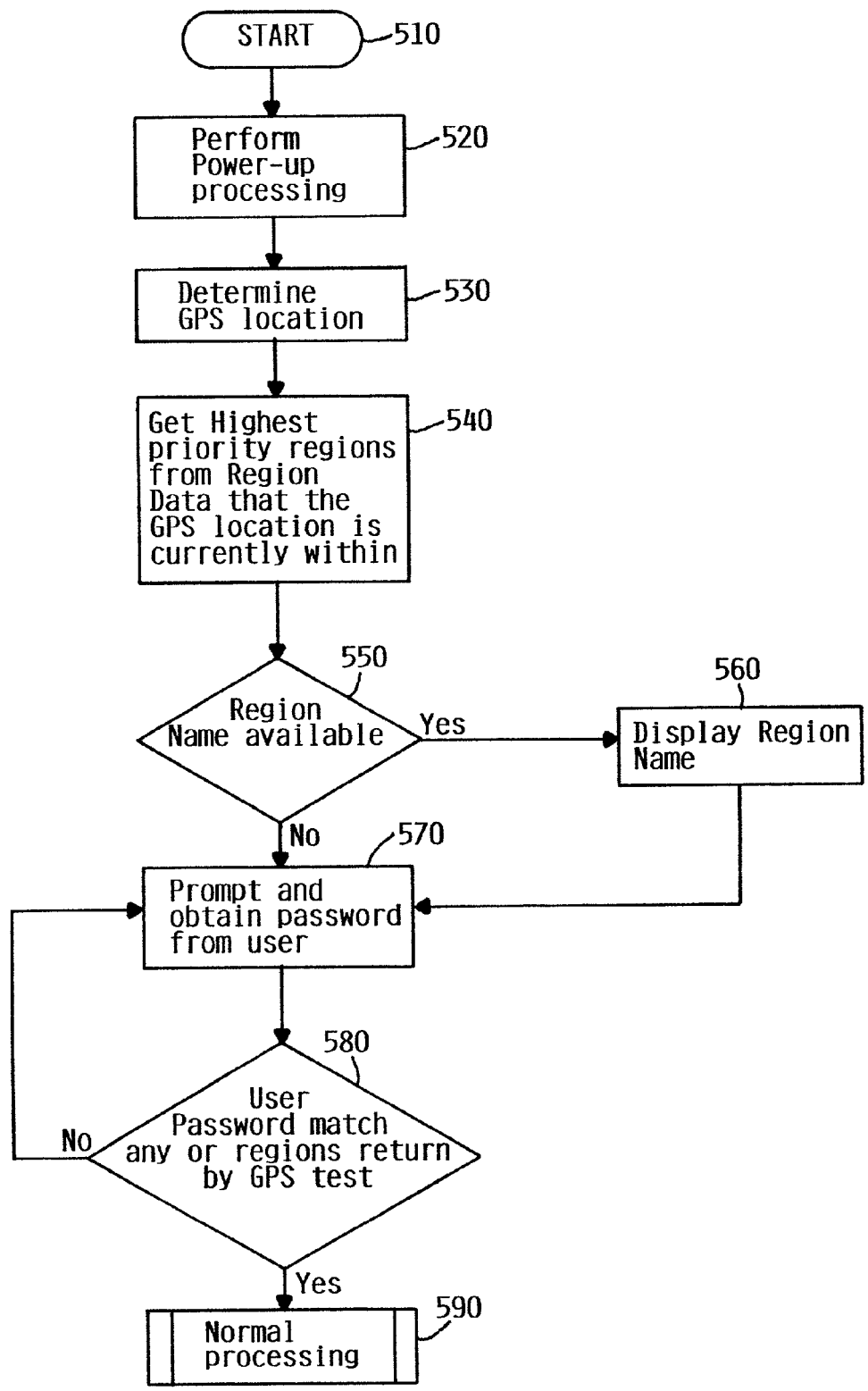
FIG. 5 is a simplified flow chart of how an electronic processing device can be enabled during power-on within a geographic location have a particularized password.

FIG. 5 is a simplified flow chart of the process by which to use the geographic-specific passwords in accordance with a preferred embodiment of the invention. In step 510, an electronic device has been started and in step 520, power-up processing occurs. In step 530, the geographic location of the electronic processing device is determined, preferably by using the GPS data that is received using GPS processing electronics installed in the device. Given a specific location, in step 540 the process continues and retrieves the highest priority regions associated with the processed geographic location. If a region name is available, as in step 550, it is displayed in step 560. Regardless, in step 570, the user is prompted to enter a password. The process in step 580 compares the entered password with the passwords associated with the regions of highest priority in the geographic location. There may be several regions of equal priority associated with a particular geographic location. In this case in the preferred embodiment, the user can enter either password to gain access. If the password passes muster, normal processing ensues as in step 590, otherwise, the user is again prompted for a password in step 570.

Figure 6:
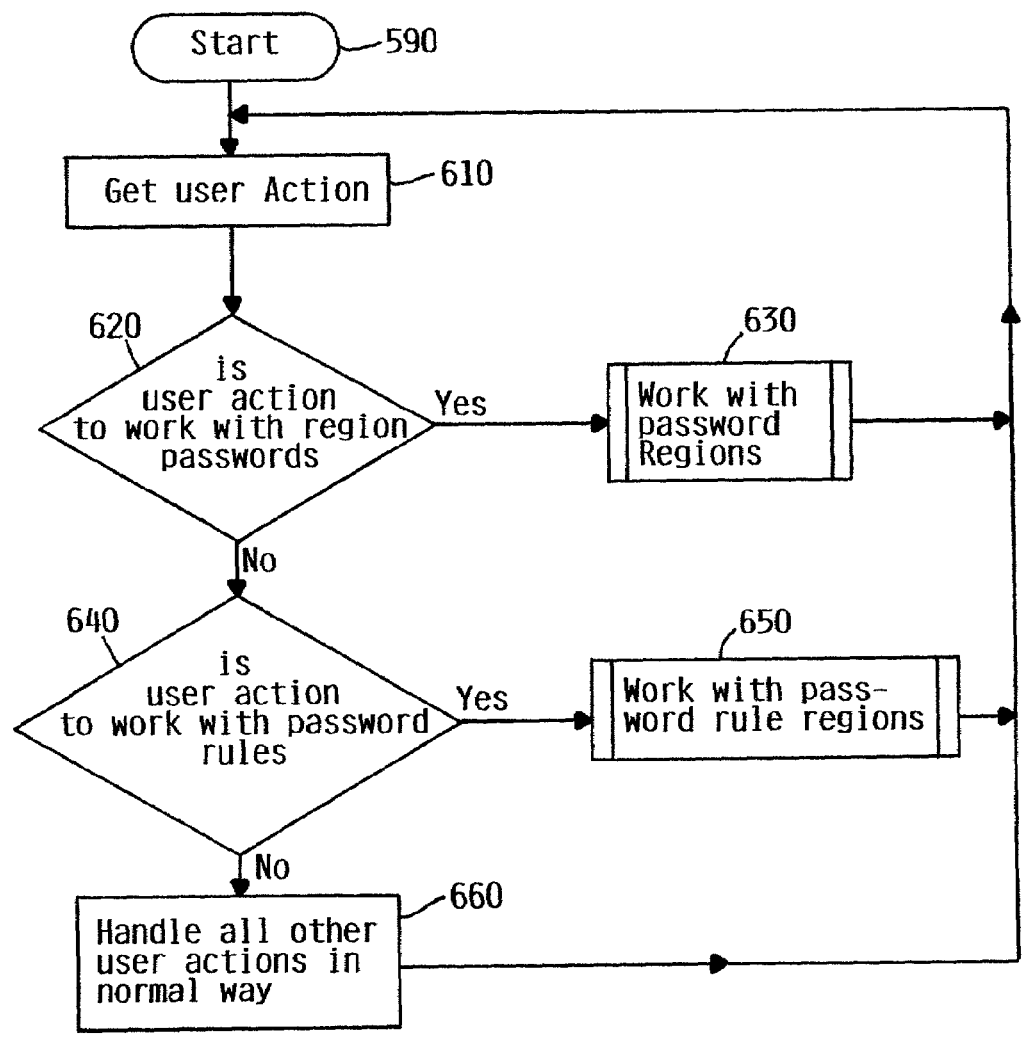
FIG. 6 is a simplified flow chart of processing within an electronic processing device to change regions, passwords, priority, or password rules of a particular geographic location.

FIG. 6 is a flowchart of normal processing and proceeds from step 570. In step 610, a user initiates an action on the user interface and the process responds in step 620 by asking if the user wishes to modify or delete or add regions, passwords, priorities. If so, then in step 630, execution is diverted to a program to do so, as will be explained. If not, the user is asked in step 640 if he/she wishes to modify the password rules. If yes, then in step 650, execution is diverted to a program to modify the rules as in step 650. If the user does not wish to modify the regions, passwords, priorities, or password rules, then in step 660, normal processing of other user actions occurs.

Figure 7A:
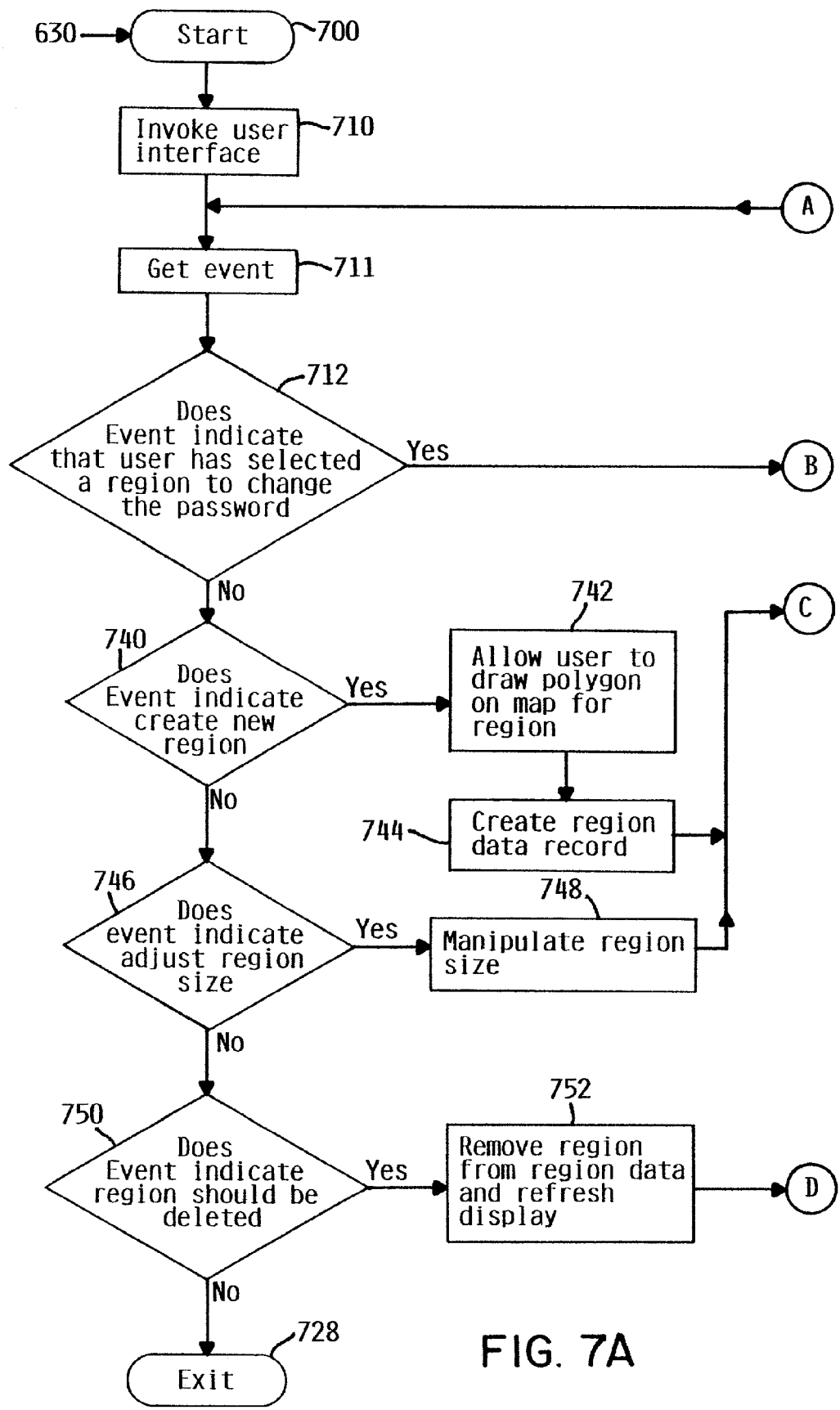
FIGS. 7A and 7B are a simplified flow chart of the processing within an electronic device which can modify the data structure associated with a particular geographic location.
Figure 7B:
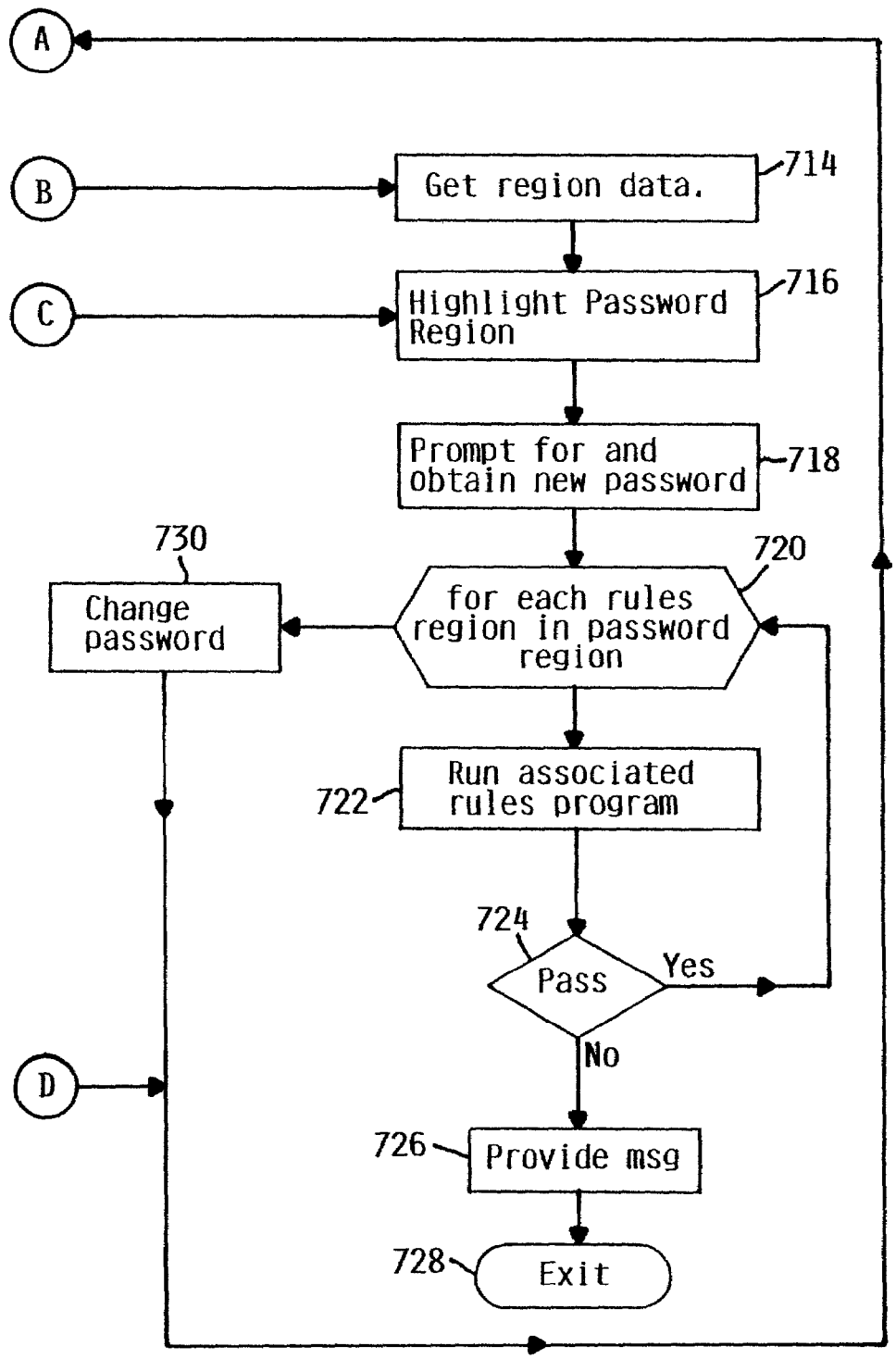

FIGS. 7A and 7B are a simplified process diagram following from step 630 of FIG. 6. In step 700, the process is initiated, and in step 710, a user interface is invoked. As discussed, the user interface may be a map of the geographic location which can be manipulated to determine regions or it may be as simple as a request to enter longitude and latitude coordinates, street addresses, etc. Given the user interface, the program requests an action from the user in step 711. If the user wants to modify an existing password, as in step 712, then in step 714, the program retrieves the region data structure 310 set forth in FIG. 3. The region associated with the password to be modified is highlighted or otherwise indicated, as in step 716. The user is prompted to enter a new password in step 718 and in step 720, the process determines if there are any rules associated with this region. If so, then in steps 722 and 724, the process inspects the new password for compliance with the password rules and, if in compliance, the process is routed back to block 720 to determine if there are any other password rules for the region. If not, then in step 730, the password is changed and the user is prompted for another event, as in step 711. If, however, the new password is not in compliance with the password rules, then in step 726 a message is provided to the user and the program exits at step 728.

In FIGS. 7A and 7B, if the user does not wish to change a password at step 712, then the process inquires if the user wishes to create a new region in step 740. If so, then in step 742, the user enters the boundaries of the geographic region the user wishes to associate with a password, preferably using a graphical user interface to draw a polygon circumscribing the region. Otherwise, the user may just enter the boundaries or the latitude/longitude data, legal description, etc. The program creates a data record 320 for the region in step 744 including the priority and name of the region. The process then jumps to step 716 to highlight the region and prepare for entry and verification of a new password as described above.

In step 740, if the user does not wish to create a region, then in step 746, the process inquires of the user if she/he wishes to modify the size of the region. If so, then in step 748, the user manipulates or otherwise enters the modified size of the region with the user interface and the process continues to step 716 above. If, however, the user does not wish to create or modify a region, then in step 750, the user is asked if she/he wishes to delete a region. If so, the region is deleted in step 752 and the user is requested for a user action as in step 711. Otherwise, the program exits as in step 728.

Figure 8A:
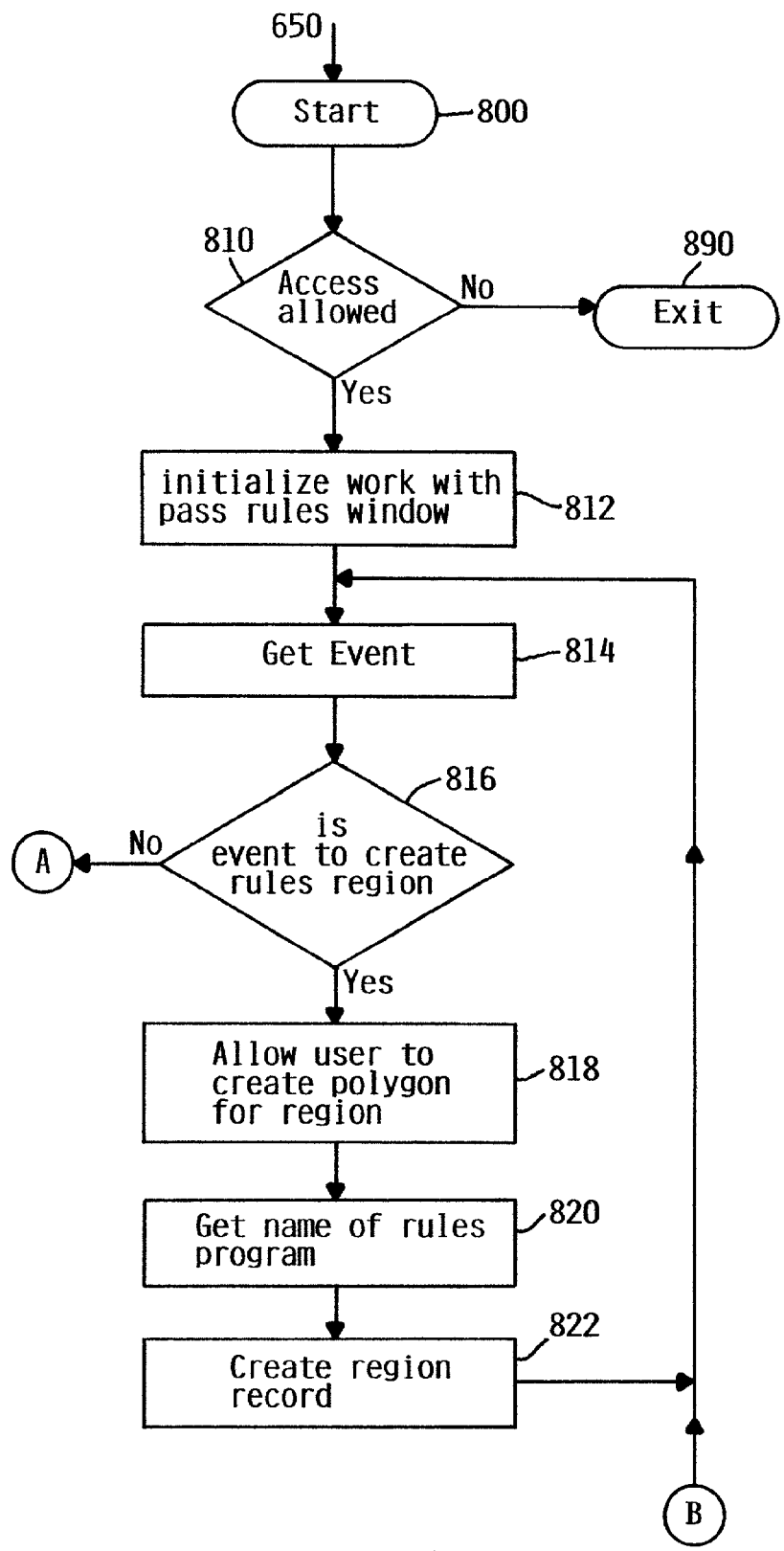
FIGS. 8A and 8B are a simplified flow chart of processing within an electronic device which can be used to modify the password rules within a geographic location.
Figure 8B:
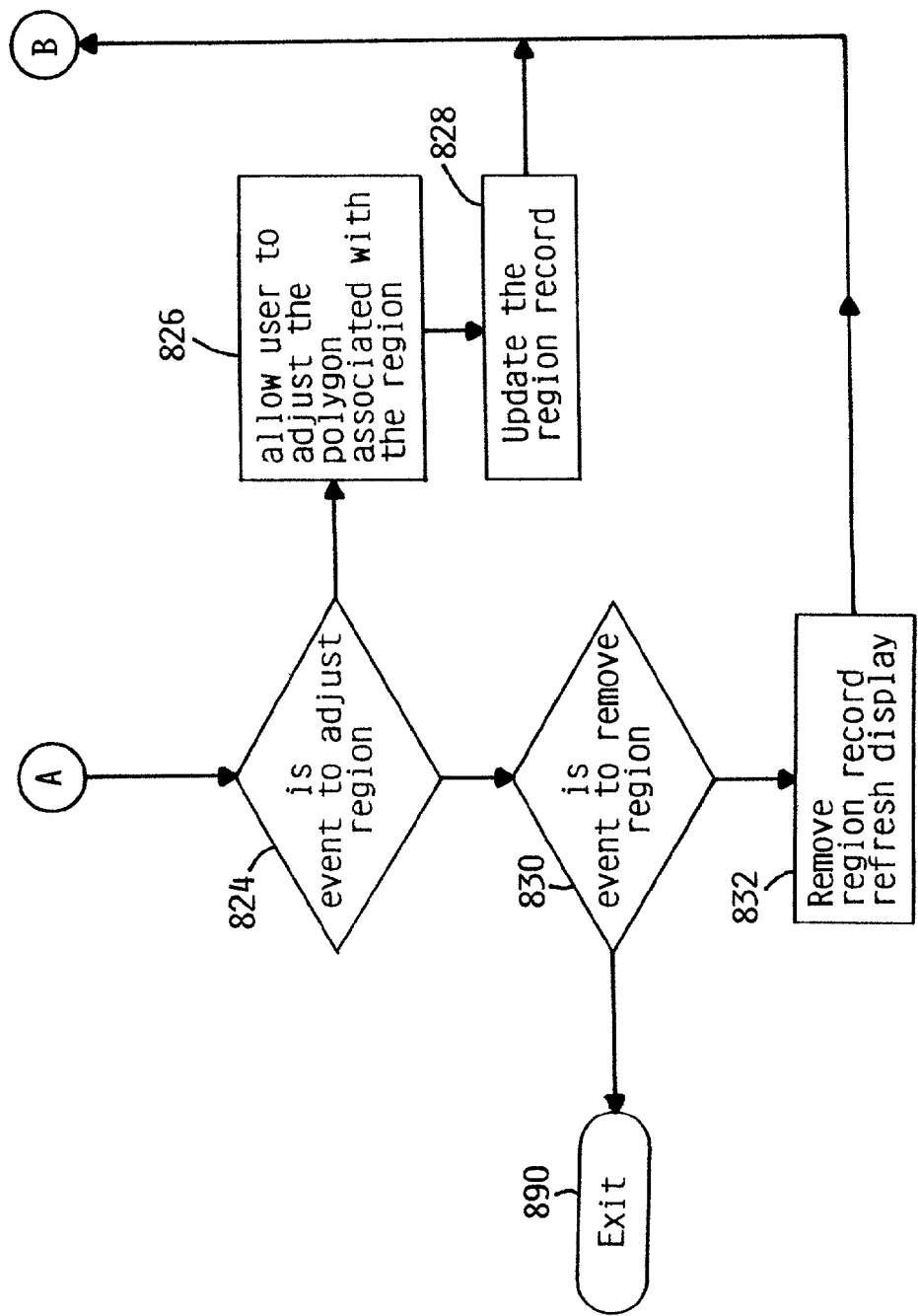

FIGS. 8A and 8B are a simplified flow chart of the process by which the rules of a password may be changed proceeding from step 650 of FIG. 6. In step 800, the program is initiated and in step 810, the process inquires if the user is permitted access to change the password rules. Often, this step is set by an administrator of the password rules associated with the electronic processing device. If the user is permitted to change the password rules, then in step 812, the work is initialized with an appropriate user interface window. In step 814, the user initiates an event and the process determines if the event is to create a rules region, as in step 816. If so, then with a user interface, the user creates a region in step 818 and in step 820 acquires the name of the rules program.

While various embodiments of the present invention have been described above, it should be understood that they have been presented by way of example and not limitation and that variations are possible. Thus, the breadth and scope of the present invention should not be limited by any of the above-described exemplary embodiments, but should be defined only in accordance with the following claims and their equivalents.

What is claimed is:

1. An electronic processing device, comprising:
    (a) a user interface to interact with a user;
    (b) location detection electronics;
    (c) processing electronics connected to the user interface and the location detection electronics;
    (d) memory to store a plurality of geographically-unique passwords, wherein each geographically-unique password is associated with one or more of a plurality of geographic regions, the memory connected to the processing electronics;
    (e) a gatekeeper to access the processing electronics when a password input on the user interface that is the same as at least one the plurality of geographically-unique passwords in memory and when the location detection electronics inputs a present location to the processing electronics that is one of the plurality of geographic regions with which the input password is associated.

2. A method to establish a geographically-unique password in an electronic processing device, comprising the steps of:
    (a) invoking a user interface of the electronic processing device;
    (b) entering a description of a first geographic location;
    (c) creating a first geographically-unique password;
    (d) associating the first geographically-unique password with the first geographic region;
    (e) enabling the electronic device when the electronic device is in the first geographic region only when the first geographically-unique password is entered by the user.

3. The method of claim 2, wherein the step of entering a description of a first geographic region further comprises:
    (a) obtaining the GPS location from GPS processing electronics within the electronic processing device; and
    (b) creating boundaries by extending a selected distance from the GPS location.

4. The method of claim 2, wherein the step of entering a description of a first geographic region further comprises:
    (a) delineating the boundaries of the first geographic region using a graphical user interface on a map containing the first geographic region.

5. The method of claim 2, wherein the step of entering a description of a first geographic region further comprises entering the longitude and latitude coordinates of the boundaries of the geographic region.

6. The method of claim 2, wherein the step of entering a description of a first geographic region further comprises entering a street address associated with a geographic region.

7. The method of claim 2, further comprising:
    (a) entering a description of a second geographic region;
    (b) creating a second geographically-unique password associated with the second geographic region.

8. The method of claim 7, further comprising:
    (a) assigning a priority to the first and second geographic region.

9. The method of claim 8, further comprising:
    (a) allowing the user to access the electronic processing device in the second region by entering the first geographically-unique password if the first geographic region is of higher and/or equal priority than the second geographic region and the electronic processing device is in an area of the second region overlapping an area of the first region.

10. The method of claim 2, wherein the step of creating a geographically-unique password further comprises:
    (a) inspecting the geographically-unique password to determine if it is valid according to password generation rules.

11. The method of claim 7, wherein the step of creating the first geographically-unique password and the second geographically-unique password further comprises inspecting the first and second geographically-unique passwords to determine if they are valid according to password generation rules.

12. The method of claim 11, wherein the password generation rules for the first geographically-unique password are different than the password generation rules for the second geographically-unique password.

13. The method of claim 2, wherein the step of enabling the electronic device when the electronic device is in the first geographic region only when the first geographically-unique password is entered by the user, further comprises determining the present location of the electronic device using GPS signals processed by GPS processing electronics within the electronic device.

14. A method to protect an electronic processing device from unauthorized use, comprising the steps of:
    (a) invoking a user interface of the electronic processing device;
    (b) entering a description of at least one geographic location by a method selected from the group of methods consisting of: obtaining the GPS location from GPS processing electronics within the electronic processing device and creating boundaries by extending a selected distance from the GPS location, delineating the boundaries of the first geographic region using a graphical user interface on a map containing the first geographic region, entering the longitude and latitude of the boundaries of the geographic region, and entering a street address associated with a geographic region;

(c) associating at least one geographically-unique password with one of the at least one geographic regions;
(d) determining the present location of the electronic processing device using GPS signals processed by GPS processing electronics within the electronic processing device;
(e) assigning priority to the at least one geographic region;
(f) allowing the user to use the electronic processing device in the at least one geographic region by entering the at least one geographically-unique password if the at least one geographic region is the geographic region associated with the at least one geographically-unique password or if the at least one geographically-unique password is associated with a geographic region of higher or equal priority that contains the at least one geographic region.

15. An article of manufacture, comprising a data storage medium tangibly embodying a program of machine readable instructions executable by an electronic processing apparatus to perform method steps for operating the electronic processing apparatus, said method steps comprising the steps of:
(a) storing a plurality of descriptions of geographic regions;
(b) storing a plurality of geographically-unique passwords, the geographically-unique passwords being each associated with one or more of the descriptions of geographic regions;
(c) assigning a priority to each of the plurality of descriptions of geographic regions;
(d) determining the present location of the electronic processing device; and
(e) allowing a user to use the electronic processing device in the present location by entering an input password if the present location is within the description of the geographic region associated with the input password.

16. A secure electronic processing device, comprising:
(a) means to store a plurality of descriptions of geographic locations in which said secure electronic processing device may be used;
(b) means to store a plurality of geographically-unique passwords, each of said passwords associated with at least one of said geographic locations;
(c) means to determine the present location of said electronic processing device;
(d) means to determine that said present location is one of said geographic locations;
(e) means to request an input password from a user;
(f) means to enable the electronic processing device only if said input password is one of said geographically-unique passwords pertaining to said present location.

17. The secure electronic processing device of claim 16, wherein the means to determine that said present location is one of said geographic locations further comprises a GPS antenna and GPS processing electronics.

* * * * *